United States Patent [19]

Umezawa et al.

[11] Patent Number: 5,049,224

[45] Date of Patent: Sep. 17, 1991

[54] METHOD OF FABRICATING PIPE UNITS

[75] Inventors: Yoshinori Umezawa, Ebina; Yoshiharu Shitara, Yokohama; Akira Iwawaki, Yokohama; Satoshi Araki, Yokohama, all of Japan

[73] Assignee: Ishikawajima-Harima Heavy Industries Co., Ltd., Tokyo, Japan

[21] Appl. No.: 409,209

[22] Filed: Sep. 19, 1989

[30] Foreign Application Priority Data

Sep. 19, 1988 [JP] Japan ............................... 63-234554
Oct. 3, 1988 [JP] Japan ............................... 63-247391
Oct. 7, 1988 [JP] Japan ............................... 63-251893

[51] Int. Cl.$^5$ .................... B29C 49/04; B29C 49/20
[52] U.S. Cl. .................................... 156/294; 29/428; 29/451; 29/890.14; 156/304.2; 264/512; 264/515; 264/516; 425/503; 425/525
[58] Field of Search ............ 264/512, 516, 515, 514, 264/513, 523, 527, 529, 531, 568, 565; 156/304.2, 304.5, 304.6, 294; 425/503, 504, 525, 527; 29/890.14, 890.144, 890.147, 428, 469, 469.5, 451

[56] References Cited

U.S. PATENT DOCUMENTS 4,280,859 7/1981 Thompson ..................... 264/513
4,801,347 1/1989 Garwood ....................... 264/512 X

FOREIGN PATENT DOCUMENTS 750299 10/1970 Belgium ........................ 264/515
40-2265 2/1965 Japan ........................... 264/515
49-33348 9/1974 Japan ........................... 264/515
55-161623 12/1980 Japan ........................... 264/523
58-124622 7/1983 Japan ........................... 264/515
58-126121 7/1983 Japan ........................... 264/515
59-042936 3/1984 Japan ........................... 264/516

Primary Examiner—Jan H. Silbaugh
Assistant Examiner—Catherine Timm
Attorney, Agent, or Firm—Dykema Gossett

[57] ABSTRACT

A method of fabricating a bundle-like pipe unit using a blow molding machine having a plurality of heads feeding parisons into a molding die includes the steps of forming a plurality of hollows independent from each other in the molding die, forming one or more channels connecting the hollows to each other laterally, feeding the parisons into the hollows from the respective heads of the blow molding machine, and blowing air into the parisons in a manner such that a plurality of independent pipes are molded in the respective hollows and the pipes are joined with each other at the lateral walls by the parisons which are forced into the channels upon air blowing. Suction forces are preferably applied on the parisons when the parisons are fed into the hollows of the molding die. The pipe unit thusly fabricated is light in weight and possesses flexibility as well as anti-corrosion properties due to the characteristics of the parisons.

17 Claims, 10 Drawing Sheets

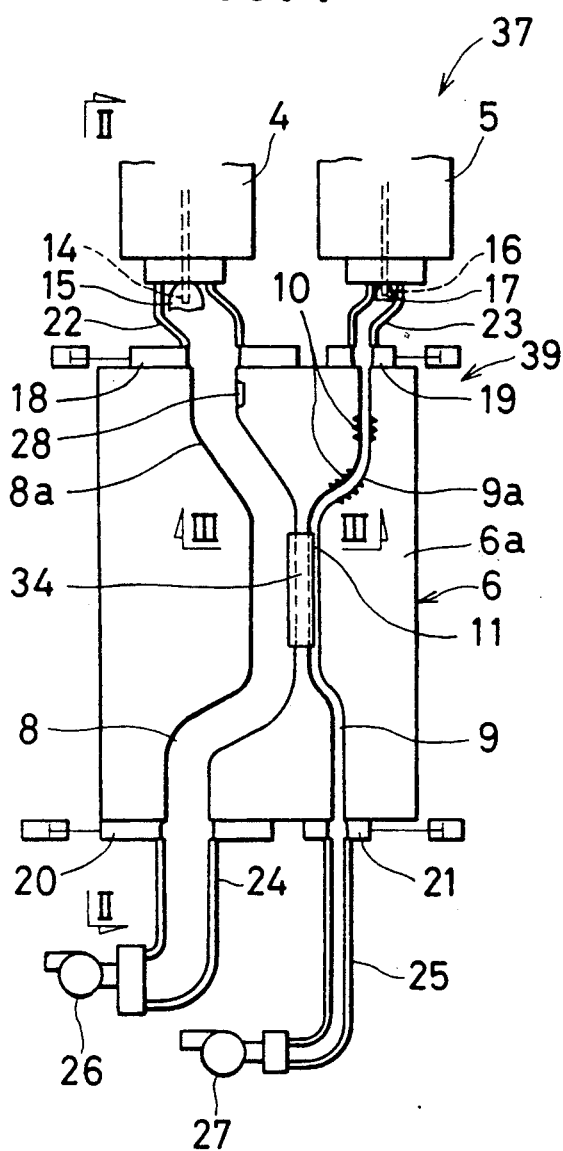
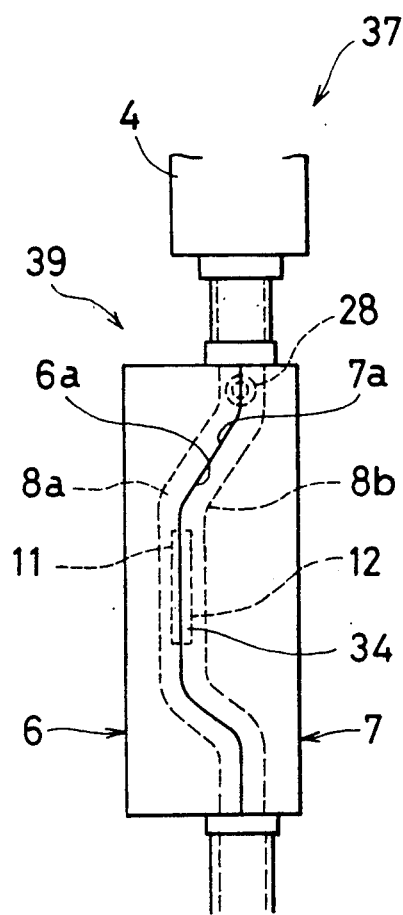
FIG.4
FIG.5

FIG.19
FIG.20
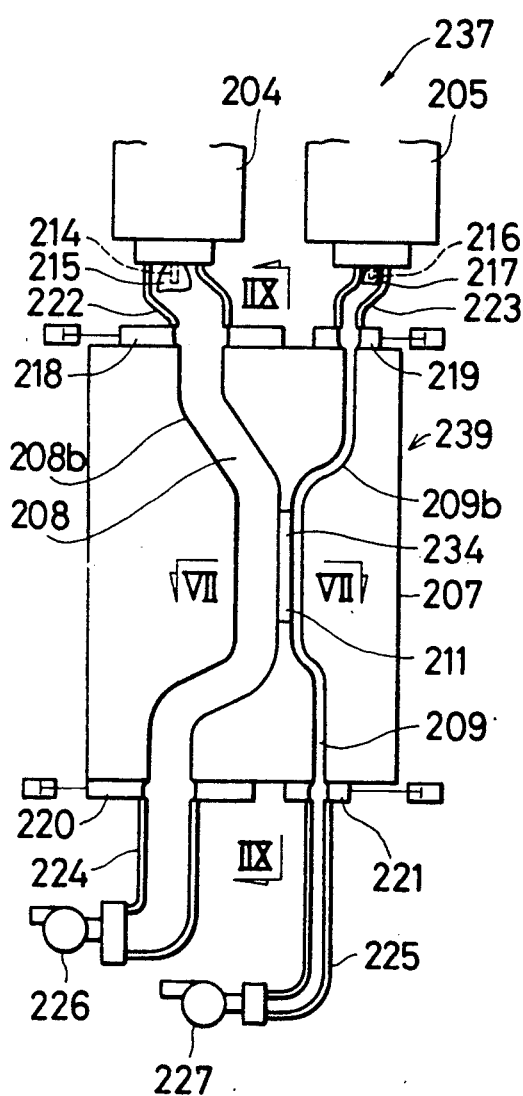
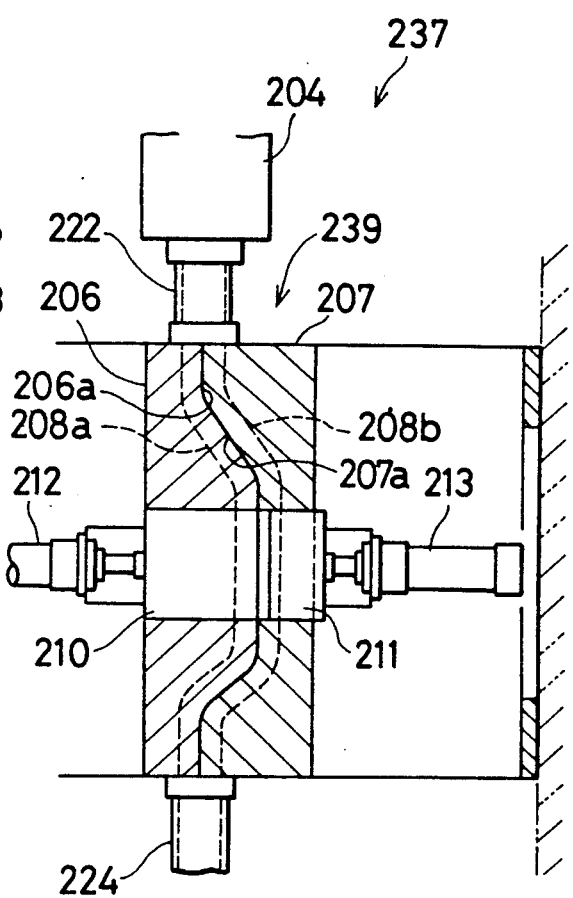

METHOD OF FABRICATING PIPE UNITS

BACKGROUND OF THE INVENTION

1. Technical Field

The present invention generally relates to a method of fabricating a plurality of pipes for conveying fluid, for example those adapted for use in a gasoline tank of an automobile, and particularly to a method of fabricating a resin-made bundle-like pipe unit including a plurality of independent pipes joined with each other at the lateral walls thereof, as well as to the pipe units produced thereby.

2. Background Art

Generally, a pipe unit used as an inlet pipe of a gasoline tank of an automobile includes a large bore pipe (called "parent pipe") for conveying the gasoline and a small bore pipe (called "child pipe") for breathing. Usually, the child pipe is coupled with the parent pipe at one end thereof, and these two pipes define a single pipe unit.

Conventionally, the above-mentioned pipe units are made of metal and manufactured by joining the child pipe with the parent pipe by means of brazing or spot welding at a part thereof and coupling the child pipe with the parent pipe at one end thereof. However, this method has the following shortcomings:

(1) The pipe unit is heavy in weight since each pipe is made from metal.
(2) Many steps are required in manufacturing the pipe unit so that it is difficult to lower the product cost.
(3) The pipes are subject to rusting since they are metallic.
(4) When one end of the child pipe is coupled with the parent pipe, problems are inevitable since the metallic pipes do not possess flexibility.

On the other hand, it also known that two resin pipes can be separately manufactured by means of blow molding and then joined with each other. One of the blow molding methods of fabricating the pipes is disclosed in Japanese Patent Application Second Publication No. 58-47337 (47337/1983). In this reference, parison is supplied from the molding machine and introduced into a hollow having a predetermined configuration made in the molding die, then air is blown in the parison so as to inflate the parison. Accordingly, a single pipe is provided by blow molding which has a configuration which conforms to the hollow formed in the molding die. However, in order to obtain a bundle-like pipe unit having a plurality of independent pipes by this method, the plurality of pipes have to be molded separately and then joined with each other.

SUMMARY OF THE INVENTION

One object of the present invention is to provide a method of manufacturing a bundle-like pipe unit which is light in weight, requires less manufacturing steps, and which is easy to carry out.

According to one aspect of the present invention, there is provided a method, using a blow molding machine employing a divisible molding die, comprising the steps of forming a couple of cavities (first cavities) in the respective contact planes of the die elements of the divisible molding die which define a hollow (first hollow) in the molding die for manufacturing a parent pipe, forming another couple of cavities (second cavities) in the same respective contact planes which define another hollow (second hollow) for manufacturing a child pipe, forming a couple of slots spanning the first and second cavities for defining a channel connecting the first hollow with the second hollow laterally, supplying parison from the heads of the molding machine into the first and second hollows, and blowing air into the parison so as to obtain a pipe unit including the parent pipe and the child pipe which is joined with the parent pipe at the lateral walls thereof.

When the parison is introduced into the hollows of the molding die, suction forces are preferably applied to the parison from the downstream ends ("downstream" as viewed in the direction the parison moves) of the hollows in order to facilitate the penetration of the parison through the hollows. As the air blowing starts, the parison inside the hollows is inflated so that the parent pipe having a large diameter is formed in the first hollow and the child pipe having a small diameter is formed in the second hollow. At the same time, the parison is forced into the channel connecting the two hollows so that a part of the parent pipe is laterally joined through fusion with a part of the child pipe. Therefore, there is provided a pipe unit having a large diameter pipe and a small diameter pipe joined with the large pipe. The pipe unit has substantial flexibility and is light in weight since it is made of resin.

According to another aspect of the present invention, there is provided a method characterized in that a couple of valve members are disposed in the channel connecting the first hollow with the second hollow before the parison is supplied to the hollows. The valve members are removed after the parison is introduced in the hollows. Then, the air blowing process is commenced. The parison is inflated in the hollows and almost simultaneously pushed in the channel, whereby the two pipes are joined with each other by the parison.

According to yet another aspect of the present invention, there is provided a method as described above which utilizes a spacer element disposed in the channel connecting the first and second hollows prior to the air blowing. The parent pipe is joined with the child pipe via the spacer element.

These and other aspects, objects and advantages of the present invention will be more fully understood by reference to the following detailed description taken in conjunction with the various figures and appended claims.

BRIEF DESCRIPTION OF THE DRAWINGS

FIG. 4 is a front sectional view of a blow molding machine used in the method of the first embodiment;

FIG. 5 is a view taken along the line II—II in FIG. 4;

FIG. 19 is a front sectional view of a blow molding machine used in a third embodiment of the method of the present invention;

FIG. 20 is a view taken along the line IIX—IIX in FIG. 19;

DESCRIPTION OF THE PREFERRED EMBODIMENTS

First Embodiment

Figure 3:
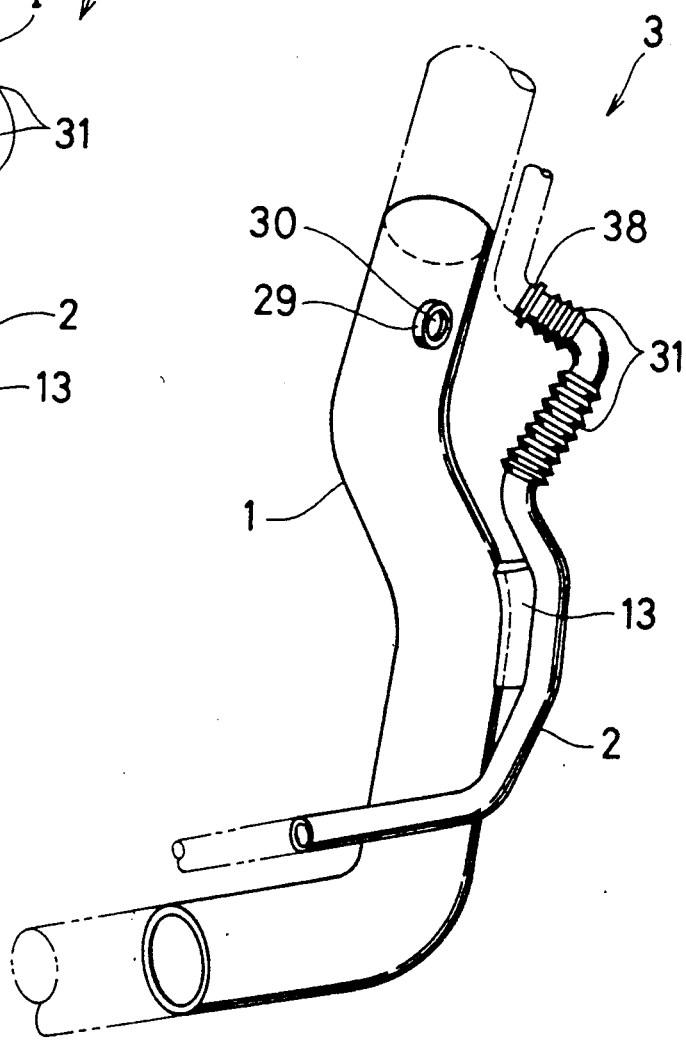
FIG. 3 is a perspective view showing a pipe unit obtained immediately after blow molding in the method of the first embodiment.

A first embodiment of a method according to the present invention will be described with reference to FIGS. 1-7 of the accompanying drawings. In this embodiment, a pipe unit 3 is fabricated having a large diameter pipe 1 and a small diameter pipe 2 as shown in FIG. 3 by means of a blow molding machine 37 as shown in FIGS. 4-7.

Referring to FIGS. 4 and 5, the blow molding machine 37 possesses two heads, i.e., a first head 4 and a second head 5. The blow molding machine in this particular embodiment is a type which molds a product having a single layer. First and second blow pins 14 and 16 respectively extend downward from the heads 4 and 5. Blow pins 14 and 16 are surrounded by first and second upper parison guides 22 and 23 respectively. Below the heads 4 and 5, there is disposed a divisible molding die 39 including a first die element 6 and a second die element 7. As illustrated in FIG. 5, the molding dies 6 and 7 contact each other at the convex plane 6a of the former and the concave plane 7a of the latter.

Two passages or hollows 8 and 9 are formed in the molding die 39. The first hollow 8 has a diameter greater than the second hollow 9 so that a large diameter pipe or parent pipe will be molded in the first hollow 8, and a small diameter pipe or child pipe will be molded in the second hollow 9. Each hollow is defined by a couple of cavities which are semicircularly (in cross-section) recessed in the contact planes 6a and 7a respectively. Namely, the first hollow 8 is defined by cavities 8a and 8b, and the second hollow 9 is defined by cavities 9a and 9b.

The upper parison guides 22 and 23 respectively extend from the bottoms of the heads 4 and 5 to the upper openings of the hollows 8 and 9 and respectively guide the parisons 15 and 17 supplied from the heads 4 and 5 to the hollows 8 and 9. The parisons 15 and 17 are made of lightweight resin. Upper pinch members 18 and 19 are provided between the upper parison guides 22 and 23 and the top of the molding 39 for closing the upper openings of the hollows 8 and 9.

Figure 6:
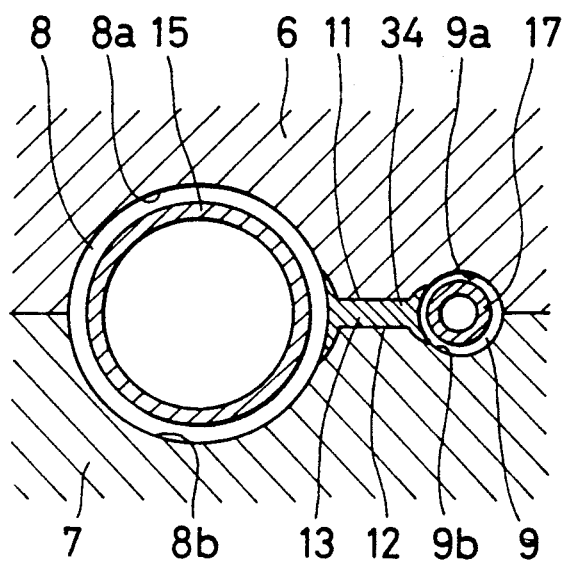
FIG. 6 is a view taken along the line III—III in FIG. 4 when parison is introduced into the first and second hollows.

As shown in FIG. 4, the hollows 8 and 9 are formed in the molding 39 in a manner such that they approach each other at the middle thereof, at which there is formed a channel 34 for connecting the first hollow 8 with the second hollow 9. The channel 34, as illustrated in FIGS. 5 and 6, is defined by a slot 11 formed in the first die element 6 and another slot 12 formed in the second die element 7.

Figure 1:
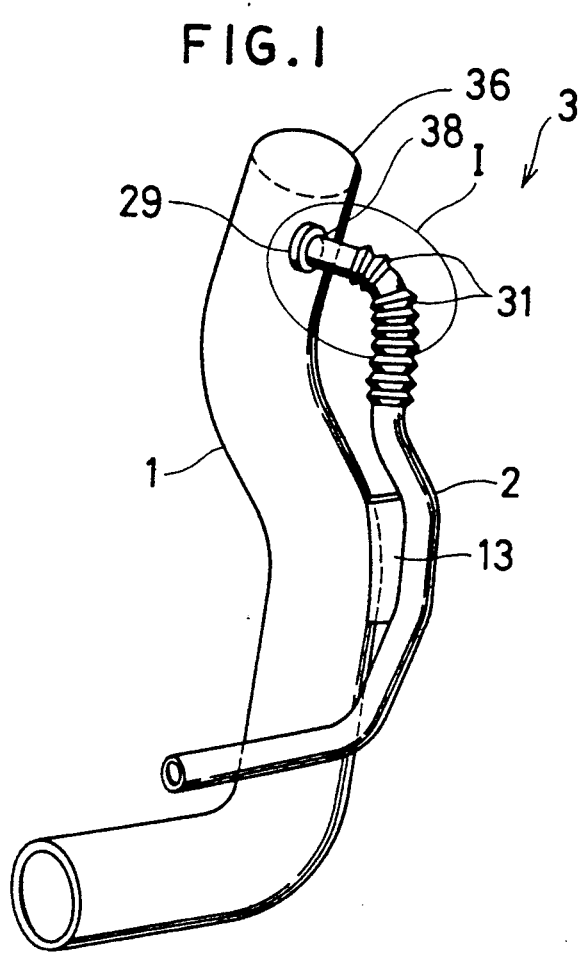
FIG. 1 is a perspective view of a pipe unit produced in accordance with a method forming a first embodiment of the present invention.
Figure 2:
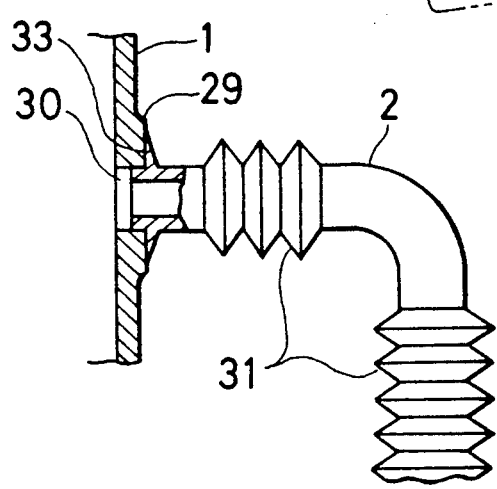
FIG. 2 is an enlarged view of part "I" of FIG. 1.

Near the upper end of the first hollow 8, there is formed a recess 28 for molding a seat 29 (FIG. 3), to which one end 38 of the child pipe 2 will be coupled (FIGS. 1 or 2). On the other hand, near the upper end of the second hollow 9, there are formed zigzag portions 10 for molding bellows 31 (FIGS. 1 or 2) as a part of the child pipe 2. The child pipe 2 possesses a high degree of flexibility at the bellows part.

Lower pinch members 20 and 21 are provided at the bottom of the molding die 39 for opening and closing the lower ends of the hollows 8 and 9. Also at the bottom of the molding die 39, there are provided lower parison guides 24 and 25. First and second blowers 26 and 27 are provided at the free ends of the lower parison guides 26 and 27 respectively for applying suction forces on the parisons 15 and 17.

Figure 7:
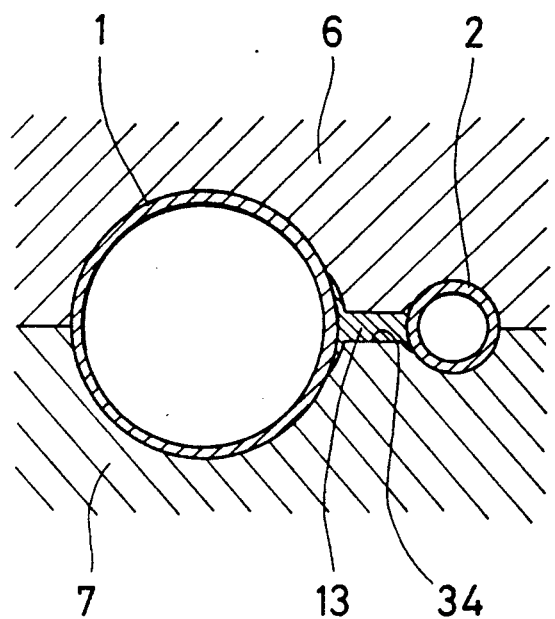
FIG. 7 is a view taken along the line III—III in FIG. 4 as the air blowing starts.

Before the parisons 15 and 17 are respectively fed from the heads 4 and 5 of the molding machine 37, a spacer 13 is placed in the channel 34 so that the hollows 8 and 9 are independent from each other. Then, the parisons 15 and 17 are supplied to the molding die 39. At the same time, the blowers 26 and 27 start evacuating the first and second hollows 8 and 9 in order to help the parisons 15 and 17 penetrate the hollows easily. The blowers 26 and 27 do not stop until the tips of the parisons 15 and 17 are pulled from the bottom of the molding die 39 by predetermined lengths, respectively. Then, the upper pinch members 18 and 19 as well as the lower pinch members 20 and 21 close the hollows 8 and 9. At this point, the first and second hollows 8 and 9 are still independent due to the spacer element 13 as shown in FIG. 6. As the air is fed in the hollow 8 from the blow pin 14 as shown in FIG. 7, the parison 15 expands until it reaches the wall defined by the cavities 8a and 8b with the seat portion 29 (FIG. 3) being integrally formed therewith, thereby forming the parent pipe 1. Likewise, the parison 17 is inflated until it reaches the wall defined by the cavities 9a and 9b as shown in FIG. 7 with the bellows portion 31 (FIG. 3) being integrally formed therewith, thereby forming the child pipe 2. At the same time, the parent and child pipes 1 and 2 are joined to each other by the spacer element 13 upon fusion of the parison. Thus there is fabricated a pipe unit 3, as illustrated in FIG. 3, which has the large pipe 1 and the small pipe 2 coupled with the large pipe 1 by the intermediate member 13, all of which elements are made of lightweight resin.

The thusly obtained pipe unit 3 is cut at either end as indicated by the double-dot line in FIG. 3 so as to obtain a pipe unit 3 of a predetermined shape. Then, referring to FIG. 1, the upper end 38 of the child pipe 2 is joined to a wall, i.e., the seat 29, of the parent pipe 1 near its top 36. Prior to this connection, an opening 30 (FIG. 3) is made at the seat 29. The connection of the two pipes is depicted in a larger scale in FIG. 2. The pipes 1 and 2 are joined by fusion at the plane 33.

The pipe unit 3 shown in FIG. 1 is, for example, used in a gasoline tank of an automobile. When the gasoline is poured in the tank, the gasoline flows into the tank through the pipe 1 while the air in the tank is expelled through the pipe 2 so that it is possible to smoothly pour the gasoline.

Various modifications may of course be made to the illustrated embodiment. For instance, the spacer 13 may connect the pipes 1 and 2 at a position other than the middle of the pipes, two bellows 31 may be made one element, and two or more channels may be formed.

Figure 8:
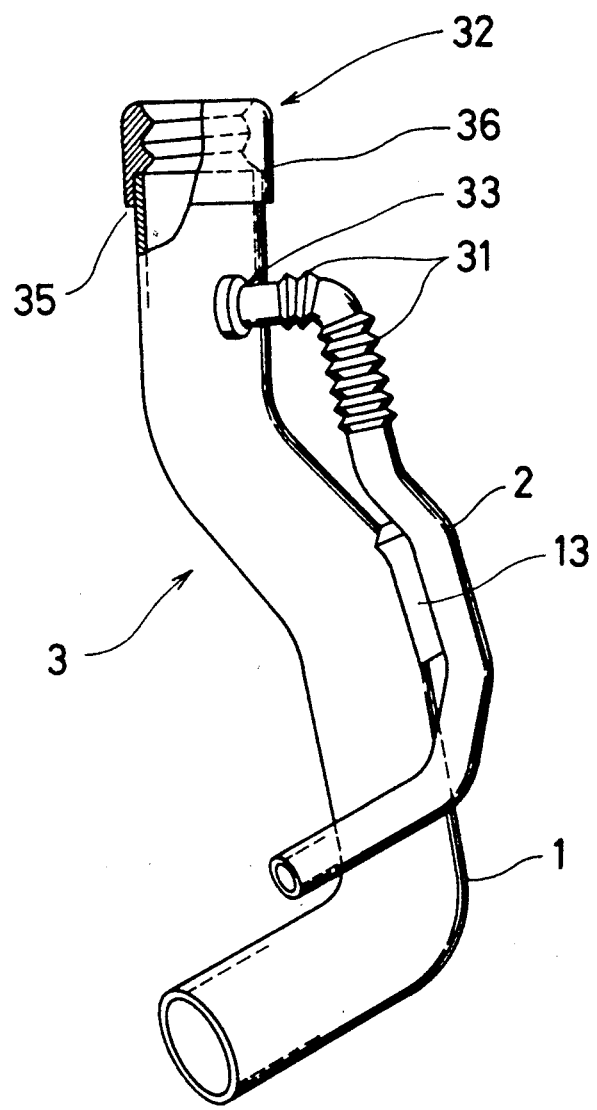
FIG. 8 is a perspective view showing a pipe unit obtained from a modification of the method of the first embodiment.

Also, as shown in FIG. 8, an attachment 32 having a female thread may be attached to the upper end 36 of the parent pipe 1. The attachment 32 may be formed by means of injection molding. The attachment 32 may be joined with the pipe 1 by fusion.

In addition, another type of blow molding machine may be employed, namely a type which can mold a product having a plurality of layers. In this case, for example, one layer is made of resin and another layer is made of anti-corrosion material.

Second Embodiment

A second embodiment will be described with reference to FIGS. 9 to 18. FIGS. 9 to 12 illustrate an example of a blow molding machine 137 for carrying out the method of this embodiment, and FIG. 13 illustrates a product 103.

Figure 9:
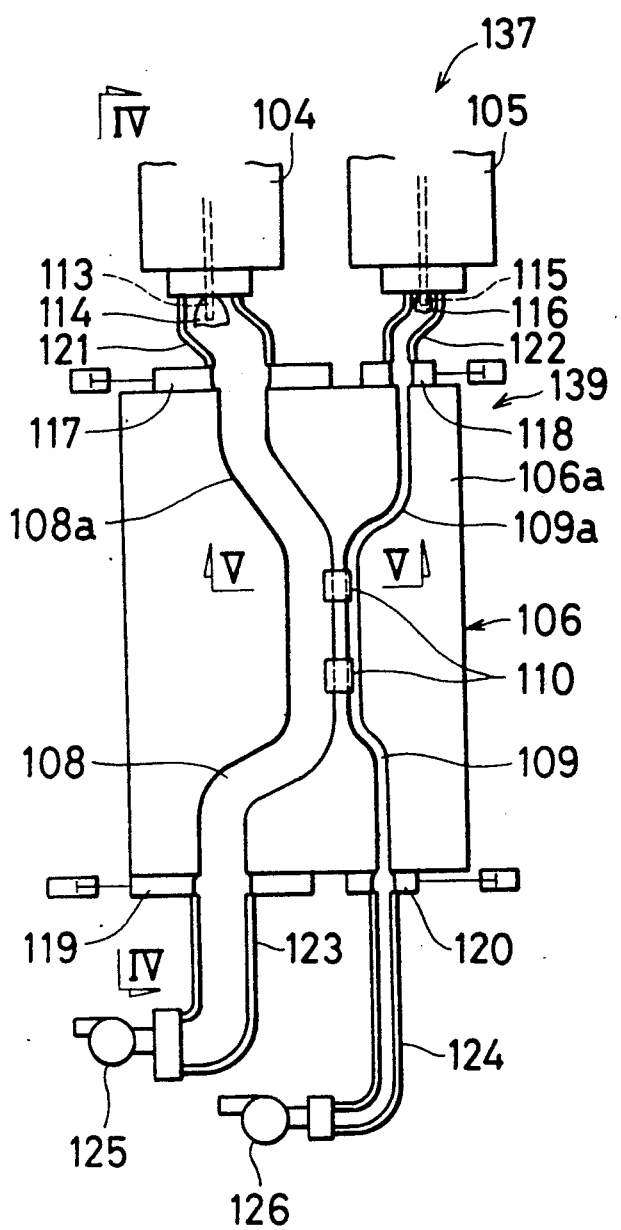
FIG. 9 is a front sectional view of a blow molding machine used in a second embodiment of the method of the present invention.
Figure 10:
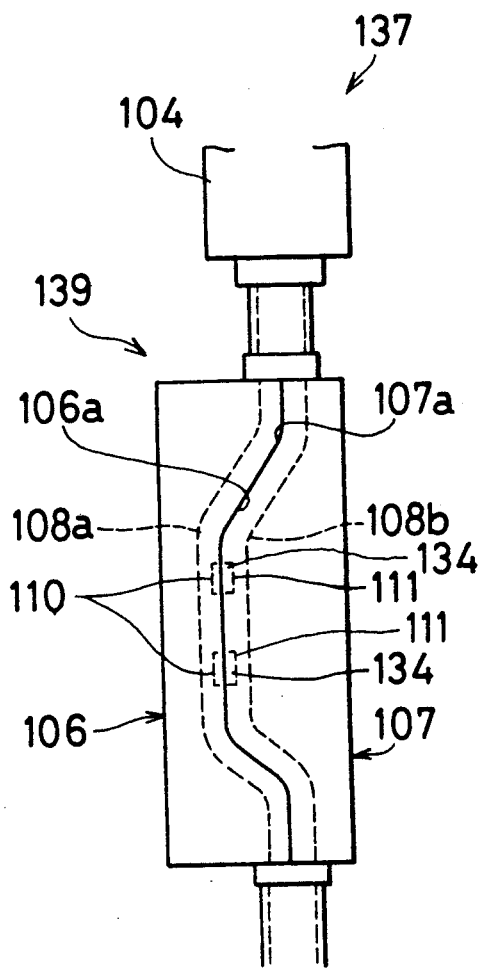
FIG. 10 is a view taken along the line IV—IV in FIG. 9.
Figure 11:
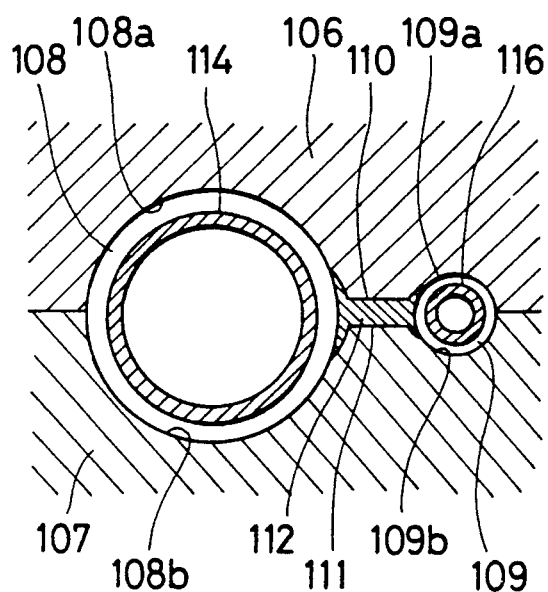
FIG. 11 is a view taken along the line V—V in FIG. 9 when parison is introduced to the first and second hollows.
Figure 12:
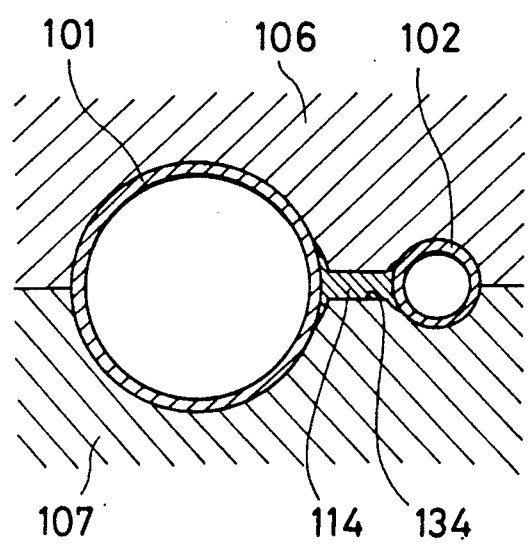
FIG. 12 is a view taken along the line V—V in FIG. 9 as the air blowing starts.

Referring to FIGS. 9 and 10, there is employed a multi-head blow molding machine 137 having a first head 104, a second head 105 and a divisible molding die 139, like the first embodiment. A first pair of cavities 108a and 108b are symmetrically formed in first and second die elements 106 and 107, and a second pair of cavities 109a and 109b are formed likewise in the die elements 106 and 107 in a manner such that they define a first hollow 108 and a second hollow 109 respectively as two die elements are coupled with each other at a concave contact plane 106a of the first die element 106 and a convex contact plane 107a of the second die element 107. The shapes of the hollows 108 and 109 are determined in accordance with the configurations of the pipes 101 and 102. The first hollow 108 and the second hollow 109 are bent toward each other at the middle thereof, as shown in FIG. 9, and there are formed two channels 134 connecting the hollows 108 and 109. The channels 134 are defined by slots 110 and 111 respectively formed in die elements 106, 107. In the channels 134, there are provided spacer elements 112, as illustrated in FIG. 11, in a manner such that the first and second hollows 108 and 109 are independent from each other. Returning to FIGS. 9 and 10, the numeral 113 designates a first blow pin for feeding air to parison 114 supplied in the first hollow 108, numeral 115 designates a second blow pin for feeding air to parison 116 supplied in the second hollow 109, numerals 117 and 118 respectively designate upper pinch members mounted on the top of the molding die 137 for cutting the parison and closing the upper openings of the hollows, numerals 119 and 120 designate lower pinch members mounted on the bottom of the molding die 137 for closing the lower ends of the hollows, numerals 121 and 122 are upper parison guides, numerals 123 and 124 are lower parison guides for guiding the parisons 114 and 116 to and from the hollows respectively, and numerals 125 and 126 designate blowers for applying suction forces on the parisons 114 and 116 respectively.

The parison 114 extruded from the first head 104 is introduced into the first hollow 108 through the guide 121. Likewise, the parison 116 from the second head 105 is introduced into the second hollow 109 through the guide 122. At the same time, the blowers 125 and 126 start applying suction forces on the parisons 114 and 116. The blowers 125 and 126 are stopped when the tips of the parisons 114 and 116 extend from the bottom of the molding die 139 by predetermined lengths respectively. Then, the upper pinch members 117 and 118 as well as the lower pinch members 119 and 120 close the hollows 108 and 109, and the air blower is started. Thereupon, the parisons 114 and 116 of FIG. 11 are inflated to pipes 101 and 102 of FIG. 12. Specifically, the parison 114 expands until it reaches the wall defined by the cavities 108a and 108b as the air is fed in the hollow 108, thereby forming the parent pipe 101. Likewise, the parison 116 is inflated until it reaches the wall defined by the cavities 109a and 109b, thereby forming the child pipe 102. At the same time, the parent and child pipes 101 and 102 are joined to reach other via the spacer element 112 due to the fusion of the parisons 114 and 116. Therefore, fabricated is a pipe unit 103, as illustrated in FIG. 13, which includes the large pipe 101 and the small pipe 102 joined to each other by the intermediate member 112, all of which elements are made of lightweight resin.

Figure 13:
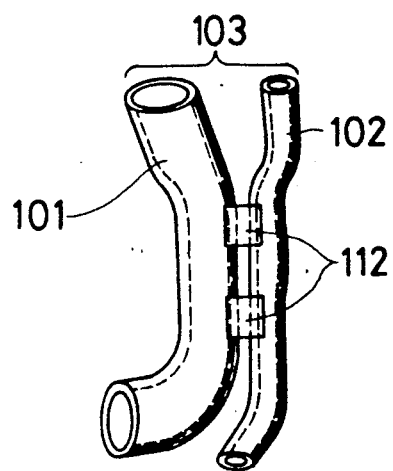
FIG. 13 is a perspective view showing a pipe unit obtained from the second embodiment of the method of the present invention.

The thusly obtained pipe unit 103 shown in FIG. 13 is, for example, used in a gasoline tank of the automobile, as mentioned in the last embodiment.

Figure 14:
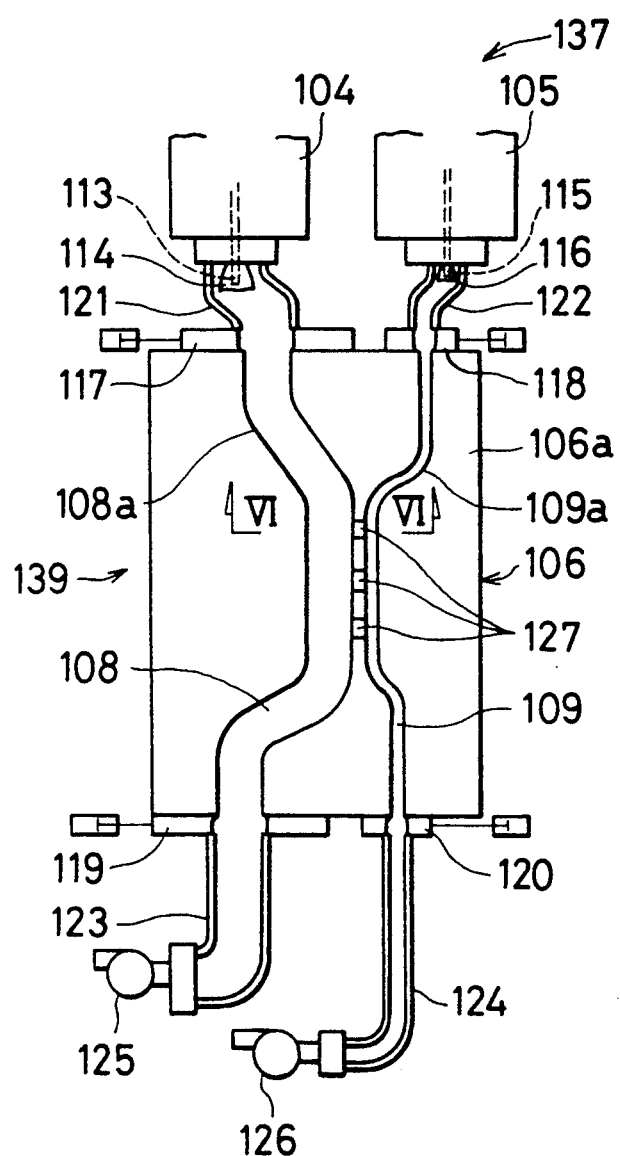
FIG. 14 is a sectional view of a blow molding machine used in the second embodiment.
Figure 15:
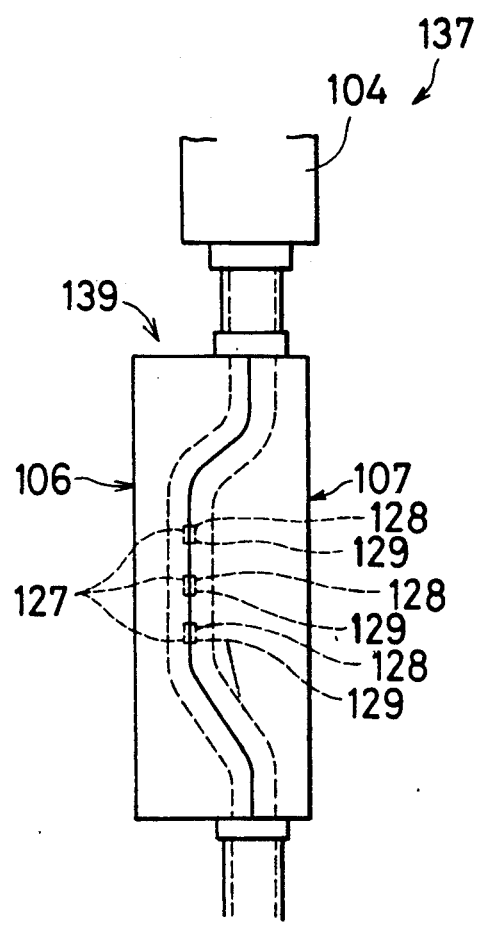
FIG. 15 is a lateral view of FIG. 14.
Figure 16:
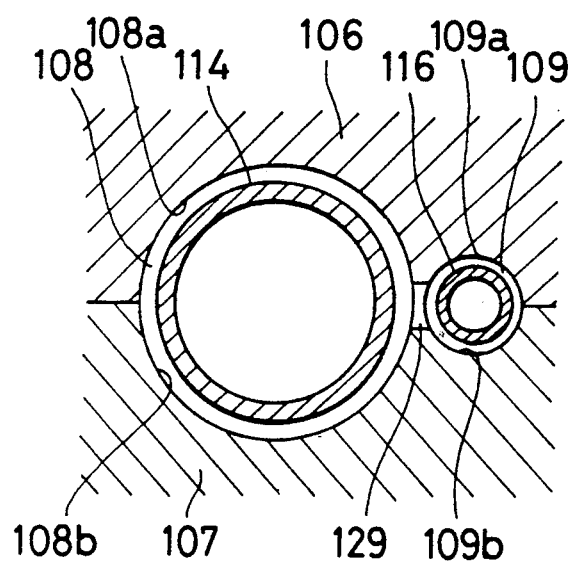
FIG. 16 is a view taken along the line VI—VI in FIG. 14 when parison is introduced to the first and second hollows.
Figure 17:
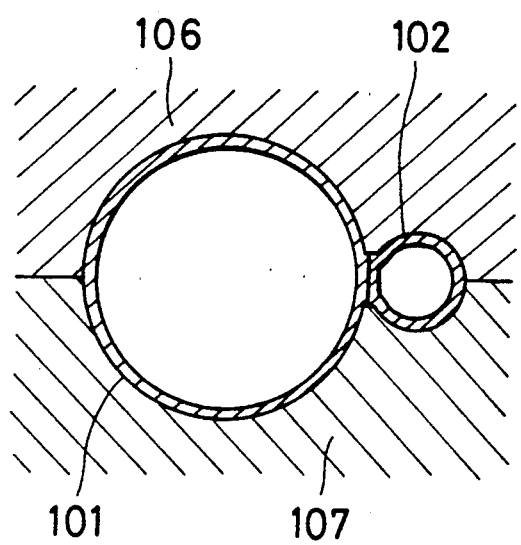
FIG. 17 is a view taken along the line VI—VI in FIG. 9 as the air blowing starts.
Figure 18:
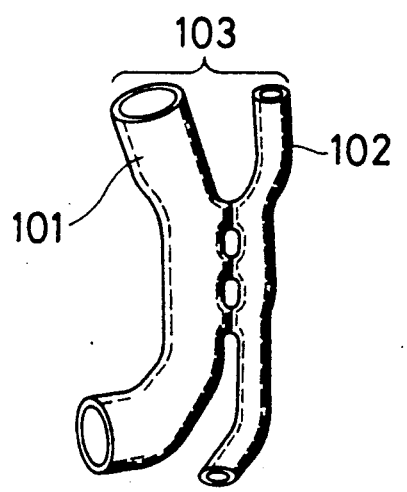
FIG. 18 is a perspective view showing a pipe unit obtained from a modification of the second embodiment of the present invention.

Various modifications may of course be made to the illustrated embodiment, and FIGS. 14 to 18 show one example thereof. Referring to FIGS. 14 and 15, three couples of slots 127 and 128 are formed in the molding die 139, whereby three channels 129 are defined. Here, it should be noted that the length of the channel 129 in the modification is short as shown in FIGS. 16 or 17 as compared with the illustration of FIGS. 11 or 12 and that the spacer element is not provided in the channels. Therefore, the parison 114 in the first hollow 108 and the parison 116 in the second hollow 109 are forced to the channels 129 upon air blowing and joined with each other due to fusion of the parison, whereby a pipe unit 103 shown in FIG. 18 is obtained. In FIGS. 9 to 18, the same numerals are given to the same elements.

In addition, the channels 129 may have a configuration other than the illustrated ones. In this case, of course, the channel 129 is shaped in a manner such that the parisons 114 and 116 easily enter the passage 129, and the fusion of the parisons 114 and 116 are not affected.

Third Embodiment

A third embodiment will be described with reference to FIGS. 19 to 23. FIGS. 19 to 22 illustrate an example of a blow molding machine 237 for carrying out the method of this embodiment which is very similar to the molding machine of the foregoing embodiments.

Figure 21:
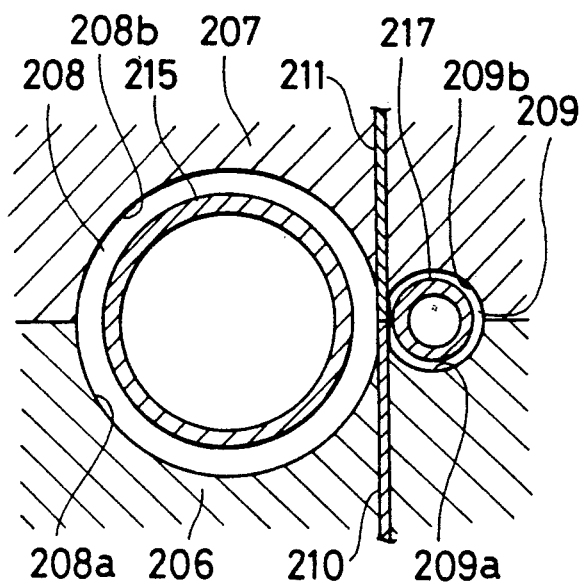
FIG. 21 is a view taken along the line VII—VII in FIG. 19 when parison is introduced to the first and second hollows.
Figure 22:
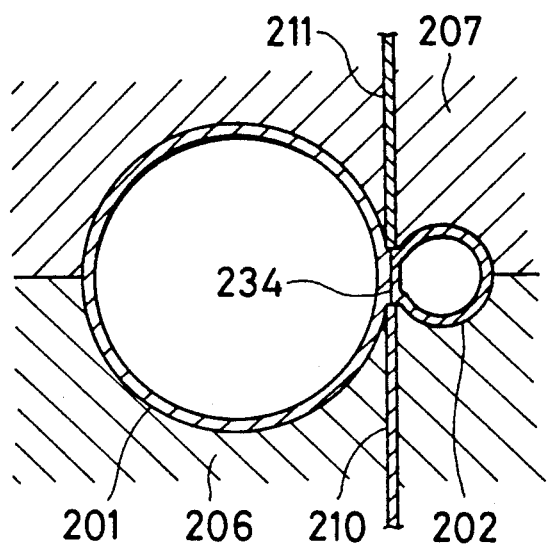
FIG. 22 is a view taken along the line VII—VII of FIG. 19 as the blow molding starts.

Referring to FIGS. 19 and 20, there is illustrated a multi-head molding machine 237 having a first head 204 and a second head 205 as well as a divisible molding die 239. A first pair of cavities 208a and 208b are symmetrically formed in the contact planes 206a and 207a of two die elements 206 and 207 respectively, and a second pair of cavities 209a and 209b are also formed in the contact planes 206a and 207a of the molding die elements 206 and 207 respectively in a manner such that they define a first hollow 208 and a second hollow 209 as the divisible molding die elements 206 and 207 are joined with each other at a concave contact plane 206a and a convex contact plane 207a. The shapes of the hollows 208 and 209, i.e., the configuration of the curved surfaces of the contact planes 206a and 207a are determined in accordance with the configurations of the pipes 201 and 202. The first hollow 208 and the second hollow 209 are bent toward each other at the middle thereof, as shown in FIG. 19, and there is formed a channel 234 connecting the hollows 208 and 209. In order to close the channel 234, there is provided a valve mechanism which includes a first valve 210 and a second valve 211. When the valves 210 and 211 are moved by respective actuators 212 and 213 toward each other until they meet, the first hollow 208 and the second hollow 209 become independent from each other as shown in FIGS. 20 and 21.

Returning to FIGS. 19 and 20, numeral 214 designates a first blow pin for feeding air to parison 215 supplied in the first hollow 208, numeral 216 designates a second blow pin for feeding air to parison 217 supplied in the second hollow 209, numerals 218 and 219 designate upper pinch members mounted on the top of the molding die 237 for cutting the parisons 215 and 217 and for closing the upper openings of the hollows 208 and 209 respectively, numerals 220 and 221 designate lower pinch members mounted on the bottom of the molding die 237 for closing the lower ends of the hollows 208 and 209 respectively, numerals 222 and 223 are upper parison guides, numerals 224 and 225 are lower parison guides for guiding the parisons 215 and 217 to and from the hollows 208 and 209 respectively, and numerals 226 and 227 designate blowers for applying suction forces on the parisons 215 and 217 respectively.

Figure 23:
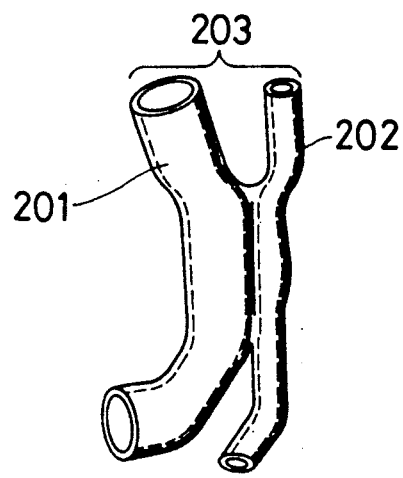
FIG. 23 is a perspective view showing a pipe unit obtained from the third embodiment of the methods of the present invention.

The parison 215 extruded from the first head 204 is introduced to the first hollow 208. Likewise, the parison 217 from the second head 205 is introduced into the second hollow 209. At the same time, the blowers 226 and 227 start sucking the interior of the hollows 208 and 290 respectively. The blowers 226 and 227 are stopped when the parisons 215 and 217 are pulled out of the molding die 239 from the bottom thereof by predetermined lengths respectively. Then, the upper pinch members 218 and 219 close the upper openings of the hollows 208 and 209 respectively. Likewise, the lower pinch members 220 and 221 close the lower openings of the hollows 208 and 209 respectively. Until then, the hollows 208 and 209 are separated from each other by the valves 210 and 211 as shown in FIG. 21. Thereafter, the valves 210 and 211 are pulled back and the air blowing is started. Thereupon the parisons 215 and 217 of FIG. 21 are inflated to pipes 201 and 202 of FIG. 22. Specifically, the parison 215 expands until it reaches the wall defined by the cavities 208a and 208b as the air is fed into the hollow 208, thereby forming a pipe 201 which is large in diameter. Likewise, the parison 217 is inflated until it reaches the wall defined by the cavities 209a and 209b, thereby forming another pipe 202 which is smaller than the pipe 201 in diameter. At the same time, these pipes 201 and 202 are joined to each other by fusion of the parisons 215 and 217 which are forced into the passage 234. Therefore, when the molding dies 206 and 207 are separated from each other, there is obtained a pipe unit 203, as illustrated in FIG. 23, which includes a large diameter pipe 201 and a small diameter pipe 202 directly joined with the large pipe 201.

Various modifications may of course be made to the illustrated embodiment. For example, another type of molding machine which has more than two heads may be employed. Specifically, when the molding machine has three heads, for example, a bundle-like pipe unit which includes three independent pipes, can be molded. Also, the pipes may be equal to each other in diameter and/or entire configuration.

What is claimed is:

1. A method of fabricating a pipe unit using a molding machine having a plurality of heads which respectively feed parisons, comprising the steps of:
   (A) providing a plurality of hollows in a molding die of the molding machine;
   (B) providing one or more channels connecting the hollows to each others laterally;
   (C) feeding the parisons into the hollows from the heads of the molding machine;
   (D) blowing air into the parisons in a manner such that a plurality of independent pipes having lateral walls are molded in the respective hollows and the pipes are joined with each other at the lateral walls thereof by the parisons which are forced in the channels; and
   (E) providing spacer elements essentially of the same cross-section as the channels prior to step (C) so as to mold a bundle-like pipe unit which has a plurality of independent pipes joined with each other at the lateral walls thereof solely by the spacer elements;
   (F) applying a suction force on the parisons when the parisons are fed into the hollows in step (C) to help the parisons penetrate the hollows and continuing to apply suction until the leading tips of the parisons are pulled from the bottom of the molding die by the suction force, and then moving pinch elements to close the hollows.

2. A method of fabricating a pipe unit using a blow molding machine having two heads which feed parisons and single, divisible molding die including two die elements, comprising the steps of:
   (A) providing a pair of cavities in each die element respectively in a manner such that there are defined two cylinder-like hollows which are different in configuration, one of the hollows being larger in diameter than the other, when the die elements are joined to form the molding die;
   (B) providing one or more pairs of slots respectively in the die elements in a manner such that they define one or more channels connecting the hollows to each other laterally when the die elements are joined to form the molding die;
   (C) joining the two die elements to form the molding die;
   (D) feeding the parisons respectively into the hollows from the heads of the blow molding machine;
   (E) blowing air into the parisons in a manner such that two independent pipes having lateral walls are molded in the respective hollows and the pipes are joined with each other at the lateral walls thereof by the parisons which are forced into the channels; and, (F) providing spacer elements essentially of the same cross-section as the channels, in the channels prior to step (D) the spacer elements having ends facing into the cavities such that the parisons are forced against the ends so as to mold a bundle-like pipe unit which has two independent pipes joined with each other by the spacer elements;

(G) forming an opening in one pipe formed in step (E); and (H) joining one free-end of the other pipe formed in step (E) to the opening formed in step (G).

3. A method of fabricating a pipe unit according to claim 2, further comprising the step of:

(I) applying a suction force on the parisons when the parisons are fed into the hollows in step (D).

4. A method of fabricating a pipe unit according to claim 2, further comprising the step of:

(I) forming in one pair of cavities one or more pairs of annular recesses, each of the recesses being V-shaped in cross-section prior to step (C) in a manner such that one pipe of the pipe unit possesses a bellows part after step (C).

5. A method of fabricating a pipe unit using a blow molding machine having a plurality of heads which respectively feed parisons, comprising the steps of:

(A) providing a plurality of hollows in a molding die of the blow molding machine;

(B) providing one or more channels connecting the hollows to each other laterally;

(C) feeding the parisons into the hollows from the heads of the blow molding machine;

(D) blowing air into the parisons in a manner such that a plurality of independent pipes having lateral walls are molded in the respective hollows and the pipes are joined with each other at the lateral walls thereof by the parisons which are forced in the channels;

(E) providing partition valve means in the channels prior to step (C); and (F) removing the partition valve means after step (C) and before step (D).

6. A method of fabricating a pipe unit according to claim 5, further comprising the step of:

(G) applying a suction force on the parisons when the parisons are fed into the hollows in step (C).

7. A method of fabricating a pipe unit using a blow molding machine having two heads which feed parisons and a single, divisible molding die including two die elements, comprising the steps of:

(A) providing a pair of cavities in each die element respectively in a manner such that there are defined two cylinder-like hollows which are different in configuration, one of the hollows being larger in diameter than the other, when the die elements are joined to form the molding die;

(B) providing one or more pairs of slots respectively in each die element in a manner such that they define one or more channels connecting the hollows to each other laterally when the die elements are joined to form the molding die;

(C) joining the two die elements to form the molding die;

(D) feeding the parisons respectively into the hollows from the heads of the blow molding machine; and (E) blowing air into the parisons in a manner such that two independent pipes having lateral walls are molded in the respective hollows and the pipes are joined with each other at the lateral walls thereof by the parisons which are forced into the channels, one of the pipes being larger in diameter than the other of the pipes;

(F) providing partition valve means in the channels prior to step (D); and (G) removing the partition valve means after step (D) and before step (E).

8. A method of fabricating a pipe unit according to claim 7, further comprising the steps of:

(H) separating the die elements from each other after step (C);

(I) forming an opening in the pipe having the larger diameter; and (J) joining one free end of the smaller diameter pipe to the opening formed in step (I) by fusion.

9. A method of fabricating pipe unit according to claim 7, further comprising the step of:

(H) applying a suction force on the parisons when the parisons are fed into the hollows in step (D).

10. A method of fabricating a pipe unit according to clam 9, further comprising the steps of:

(I) separating the die elements from each other after step (C);

(J) forming an opening in the pipe having the larger diameter; and (K) joining one free end of the smaller diameter pipe to the opening formed in step (J) by fusion.

11. A method of fabricating a pipe unit according to claim 7, further comprising the step of:

(H) forming in one pair of cavities one or more pairs of annular recesses, each of the recesses being V-shaped in cross-section prior to step (C) in a manner such that one pipe of the pipe unit possesses a bellows part after step (C).

12. A method of fabricating a pipe unit using a blow molding machine having two heads which feed parisons and a single, divisible molding die including two die elements, comprising the steps of:

(A) providing a pair of cavities in each die element respectively in a manner such that there are defined two cylinder-like hollows which are different in configuration, one of the hollows being larger in diameter than the other, when the die elements are joined to form the molding die;

(B) providing one or more pairs of slots respectively in each die elements in a manner such that they define one or more channels connecting the hollows to each other laterally when the die elements are joined to form the molding die;

(C) joining the two die elements to form the molding die;

(D) feeding the parisons respectively into the hollows from the heads of the blow molding machine;

(E) blowing air into the parisons in a manner such that two independent pipes having lateral walls are molded in the respective hollows and the pipes are joined with each other at the lateral walls thereof by the parisons which are forced into the channels, one of the pipes being larger in diameter than the other of the pipes;

(F) separating the die elements from each other after step (C);

(G) forming an opening in the pipe having the larger diameter; and (H) joining one free-end of the smaller diameter pipe to the opening formed in step (G) by fusion.

13. A method of fabricating a pipe unit, using a blow molding machine having a molding die and a plurality of heads which respectively feed parisons, a plurality of hollows being formed in the molding die with at least one channel connecting the hollows, comprising the steps of:
   (A) providing partition valve means in the channel;
   (B) feeding the parisons into the hollows from the heads of the blow molding machine while the partition valve means blocks the channel;
   (C) removing the partition valve means; and
   (D) blowing air into the parisons after step (C) in a manner such that a plurality of independent pipes, each pipe having a lateral wall are molded in the respective hollows and parisons are forced into the channel and the pipes are joined with each other at the lateral walls thereof by the parisons which are forced in the channel.

14. A method of fabricating a pipe unit, using a blow molding machine having a molding die and a plurality of heads which respectively feed parisons, a plurality of hollows being formed in the molding die with at least one channel connecting the hollows, comprising the steps of:
   (A) providing spacer elements of essentially the same cross-section as the channel in the channel so as to mold a bundle-like pipe unit which has a plurality of independent pipes joined with each other at the lateral parts thereof by the spacer elements;
   (B) feeding the parisons into the hollows from the heads of the blow molding machine;
   (C) blowing air into the parisons in a manner such that a plurality of independent pipes, each pipe having a lateral wall are molded in the respective hollows and the pipes are joined with each other at the lateral walls thereof by the parisons which are forced in the channel;
   (D) forming an opening in one pipe formed in step (C); and
   (E) joining one free-end of another pipe formed in step (C) to the opening formed in step (D).

15. A method of fabricating a pipe unit, using a blow molding machine having two heads which respectively feed parisons and a single, divisible molding die including two die elements, with a pair of cavities being respectively provided in each die element in a manner such that there are defined two cylinder-like hollows which are different in configuration, one of the hollows being larger in diameter than the other, when the die elements are joined to form the molding die, at least one pair of slots being formed respectively in the die elements in a manner such that they define at least one channel connecting the hollows to each other laterally when the die elements are joined to form the molding die, comprising the steps of:
   (A) joining two die elements to form the molding die;
   (B) providing partition valve means in the channel;
   (C) feeding the parisons respectively into the hollows from the heads of the blow molding machine;
   (D) removing the partition valve means; and
   (E) blowing air in the parisons in a manner such that two independent pipes, each pipe having a lateral wall, are molded in the respective hollows and that the pipes are joined with each other at the lateral walls thereof by the parisons which are forced in the channel.

16. A method of fabricating a pipe unit, using a blow molding machine having two heads which respectively feed parisons and a single, divisible molding die including two die elements, with two pair of cavities which are different in configuration being respectively formed in the die elements in a manner such that there are defined two cylinder-like hollows, one of the hollows being larger in diameter than the other, when the die elements are joined to form the molding die, at least one pair of slots being formed respectively in the die elements in a manner such that they define at least one channel connecting the hollows to each other laterally when the die elements are joined to form the molding die, comprising the steps of:
   (A) joining two die elements to form the molding die;
   (B) providing spacer elements of essentially the same cross-section as the channel in the channel, the spacer elements having ends facing into the hollows so as to mold a bundle-like pipe unit which has two independent pipes joined with each other by the spacer elements;
   (C) feeding the parisons respectively into the hollows from the heads of the blow molding machine; and
   (D) blowing air in the parisons in a manner such that two independent pipes, each pipe having a lateral wall, are molded in the respective hollows and forcing the parisons against the ends, such that they cover the entirety of the ends and the pipes are joined with each other at the lateral walls thereof by the parisons which are forced against the ends;
   (E) forming an opening in one pipe formed in step (D); and
   (F) joining one free-end of the other pipe formed in step (D) to the opening formed in step (E).

17. A method of fabricating a pipe unit, using a blow molding machine having two heads which respectively feed parisons and a single, divisible molding die including two die elements, with a pair of cavities being respectively provided in each die element in a manner such that there are defined two cylinder-like hollows which are different in configuration, one of the hollows being larger in diameter than the other, when the die elements are joined to form the molding die, at least one pair of slots being formed respectively in the die elements in a manner such that they define at least one channel connecting the hollows to each other laterally when the die elements are joined to form the molding die, comprising the steps of:
   (A) joining two die elements to form the molding die;
   (B) separating the die elements from each other;
   (C) feeding the parisons respectively into the hollows from the heads of the blow molding machine; and
   (D) applying a suction force on the parisons when the parisons are fed into the hollows in step (C);
   (E) blowing air in the parisons in a manner such that two independent pipes, each pipe having a lateral wall, are molded in the respective hollows and that the pipes are joined to each other at the lateral walls thereof by the parisons which forced into the channels, one of the pipes having a diameter larger than the diameter of the other pipe;
   (F) forming an opening in the pipe having the larger diameter; and
   (G) joining one free end of the smaller diameter pipe with the opening formed in step (F) by fusion.

* * * * *